United States Patent [19]

Wells

[11] Patent Number: 4,618,232
[45] Date of Patent: Oct. 21, 1986

[54] DESK TOP MICROFORM READER

[75] Inventor: Thomas R. Wells, Indian Creek, Ill.

[73] Assignee: Bell & Howell Company

[21] Appl. No.: 685,086

[22] Filed: Dec. 21, 1984

[51] Int. Cl.⁴ ............................................. G03B 21/24
[52] U.S. Cl. ....................................... 353/79; 353/119
[58] Field of Search .................. 353/79, DIG. 3, 119, 353/29, 22-24, 27 R, 98, 77, 78

[56] References Cited

U.S. PATENT DOCUMENTS

| | | | |
|---|---|---|---|
| 2,258,382 | 10/1941 | Goebel | 353/79 |
| 2,712,266 | 7/1955 | Cherouvrier | 353/79 X |
| 3,733,121 | 5/1973 | Smitzer | 353/78 X |
| 3,941,466 | 3/1976 | Shah | 353/27 R |
| 4,133,605 | 1/1979 | Wiggin | 353/DIG. 3 |
| 4,312,578 | 1/1982 | Wells et al. | 353/79 |

FOREIGN PATENT DOCUMENTS 1016853  9/1952  France ................................. 353/79

Primary Examiner—Harry N. Haroian
Attorney, Agent, or Firm—Neal C. Johnson; Alan B. Samlan

[57] ABSTRACT

A desk top microfilm reader for use on horizontal flat surfaces having a housing structure which encloses projection means and microfilm receiving means. A supporting arm extends from the housing structure to reflect images projected from the housing structure onto a flat planar surface which is only optically connected to the projection means. Both the microfilm and the projection surface are in horizontal planes.

5 Claims, 6 Drawing Figures

DESK TOP MICROFORM READER

BACKGROUND OF THE INVENTION

This invention relates to microfilm readers and more particularly to a desk top microfilm reader which projects microfilm images onto the top surface of a desk or similar horizontal surface.

With the increase in information available and the dessemination of it, and the proportional increase in paper to store the information, microfilm has become a more common storage media. The advantage is obvious. Microfilm can reduce the storage area by a hundred fold enabling large quantities of documents or graphical forms of information to be stored in a small space. The microfilm can take various storage configurations. One form is commonly referred to as microfilm jackets in which individual strips of film are placed between two transparent plastic sheets having channels to accept and retain the film. A second form similar to microfilm jackets is microfiche, in which a piece of photoplastic material approximately 4 inches by 6 inches has the information photographed thereon. Microfiche can also be made by a duplicating process from an original microfilm jacket. The size of the microfiche can vary, however, the concept encompasses placing multiple images on a single card or fiche. Another microfilm has a card with a rectangular cut therein holding an individual piece of film, commonly referred to as an aperture card. The information may also be retained on rolls of microfilm which are stored in cartridges or cassettes for later retrieval.

Microfilm has become a commonly used tool in business, industry, education, and governmental applications. It has reached a point where the individuals within an organization may require personal microfilm readers at the desks of numerous personnel.

The easiest and most commonly used individual microfilm system encompasses the use of microfilm jackets or microfiche stored at the individual user's location. The reason is that the microfiche can be easily stored in microfiche boxes or containers which can store anywhere from several to a hundred microfiche. Furthermore, the microfiche has an operator viewable index along one margin so that retrieval is simple and inexpensive. Present day microfiche readers commonly are comprised of a high intensity lamp, optical means for condensing the light from the lamp and directing the light through the microfiche, and a second set of optics for projecting the film image onto a reading surface. Thus, the recorded image is projected in an enlarged form for viewing by the operator.

Individual microfilm readers have previously been available of several types. One type was a small handheld reader which operated either with or without a projection lamp. The film was placed between an external light source and an eye piece with a lens, which was held to the viewers eye. The individual images were read through the eye piece. This was a poor means of reading complete documents as it was inconvenient to locate the particular images, and difficult to read the images through this apparatus for any length of time. Other microfilm readers used the high intensity lamp and lenses for projecting the film image onto a reading surface. The reading surface was either a translucent screen in which the image is projected onto the back of the screen and the image is observed on the opposite side of the screen. The second type, called a front projection reader, has the image projected onto the screen surface and the reflected light image is viewed directly.

The conventional microfilm readers were normally housed within a plastic or sheet metal enclosure which aids in excluding ambient light thus improving the image contrast so that the image can be viewed more easily. The enclosure causes conventional microfilm readers to be fairly large, taking up a substantial amount of desk top area. In the typical office setting, the working desk top area is generally cluttered with file trays, papers, calendars, desk blotters, etc., leaving little area for a microfilm reader.

As previously mentioned, one reason for the large size of conventional microfilm readers of the front or rear projection type is that a complete enclosure is required. The operator looks into the hood of the microfilm reader to view the projected image in a front projection device, or looks at the screen in a rear projection device. Due to the size and optical layouts of these readers, a user could not conveniently place such a device in the center of his desk while trying to work on the desk surface or while trying to converse with a person sitting opposite the microfilm reader.

One microfilm reader which was designed and illustrated in U.S. Pat. No. 4,312,578, entitled "Microfilm Reader", projects an image downward onto a work area. When the microfilm reader is not actually projecting an image, a hood rising above the work station has lamps which are energized to illuminate the work surface. Thus, the user can use the reader as a lamp to illuminate the work surface for reading or various other types of work. However, the work surface is part of the overall microfilm reader and work station and is not separable from the microfilm projection part of the device. Also, the image projected onto the work station surface is at a slight angle relative to the horizontal work surface. Furthermore, this device illustrates a fiche which is inserted vertically into the unit and held in the vertical position for projection. Due to the vertical configuration illustrated, a roller system was required to move the fiche vertically, and a sliding fiche carrier system was required for selecting the proper column in the fiche. The major drawback with the device illustrated was that people who commonly use microfilm are not familiar with a device which had a fiche orientation as illustrated. This made it difficult to position the rows and columns while the film was held vertically. The more commonly used microfilm readers hold the fiche in a horizontal plane and move the fiche in that plane for image selection. Thus, the microfilm user is able to find the desired image more easily when using a microfilm reader having the fiche held in a horizontal plane.

It would be desirable to have a microfilm reader having the excellent image characteristics of a convention microfilm reader, and yet not occupy the additional desk area of the conventional reader. It is also desirable to have a microfilm reader which does not include an integral work surface area and is thus more easily portable.

SUMMARY OF THE INVENTION

It is thus an object of this invention to provide a desk top microfilm reader which does not require an integral projection screen. This elminiates conventional rear projection or front projection screens and results in costs savings.

It is a further object of the invention to provide a desk top microfilm reader which projects the image onto the horizontal desk surface for viewing by the user. The image can be enhanced by merely placing a sheet of blank white paper on the desk in the image receiving area for easy viewing of the selected image.

Yet another object is to provide a desk top microfilm reader which has a fiche carriage which holds the microfilm in a horizontal plane. This results in both the film plane and the image receiving surface being in horizontal planes.

Still another object is to provide a microfilm reader which does not require the use of an enclosure for the projection path. This results in the elimination of the standard enclosure which houses the projection path and microfilm screen.

The applicant's inventive microfilm reader uses a housing structure which encloses the projection system only. The projection system includes a lamp, mirror, lens system, and other projection mirrors to project the image out of the housing structure. The housing structure also has a microfilm receiving tray or carriage which holds the microfilm in a flat horizontal plane. The microfilm receiving carriage can move the microfilm in the horizontal plane to select the desired image. There is a supporting arm connected to the housing structure which extends vertically from the housing structure. A mirror supported by the supporting arm receives the image projected out of the housing structure from the projection system. The image is then reflected from the mirror in the supporting arm down onto the horizontal work surface. Thus, the operator places the microfilm horizontally into the microfilm carriage and the image is projected down onto the horizontal work surface for viewing. The microfilm reader does not take up the large amount of work space that conventional microfilm readers utilize. Furthermore, the location of images on the microfilm are easily found due to the users familiarity with selecting the row and column in a horizontal arrangement as conventional readers have done in the past. Also, the advantage of an unenclosed projection path results in the user being able to converse with another person across from his desk without the interference of the enclosed hood or housing of a conventional microfilm reader. An alternate embodiment provides for the mirror supported by the mounting arm to be pivoted to a second position. This aids in ensuring that the mirror will be out of the line of sight between two persons sitting across from each other.

Other objects and advantages of the invention will become apparent upon reading the following brief description of the drawings and description of the preferred embodiment.

BRIEF DESCRIPTION OF THE DRAWINGS

FIG. 3 is an enlarged view in perspective of the roller mechanism shown in the cut away portion of FIG. 1 used to facilitate movement of the fiche carriage.

DESCRIPTION OF THE PREFERRED EMBODIMENT

Figure 1:
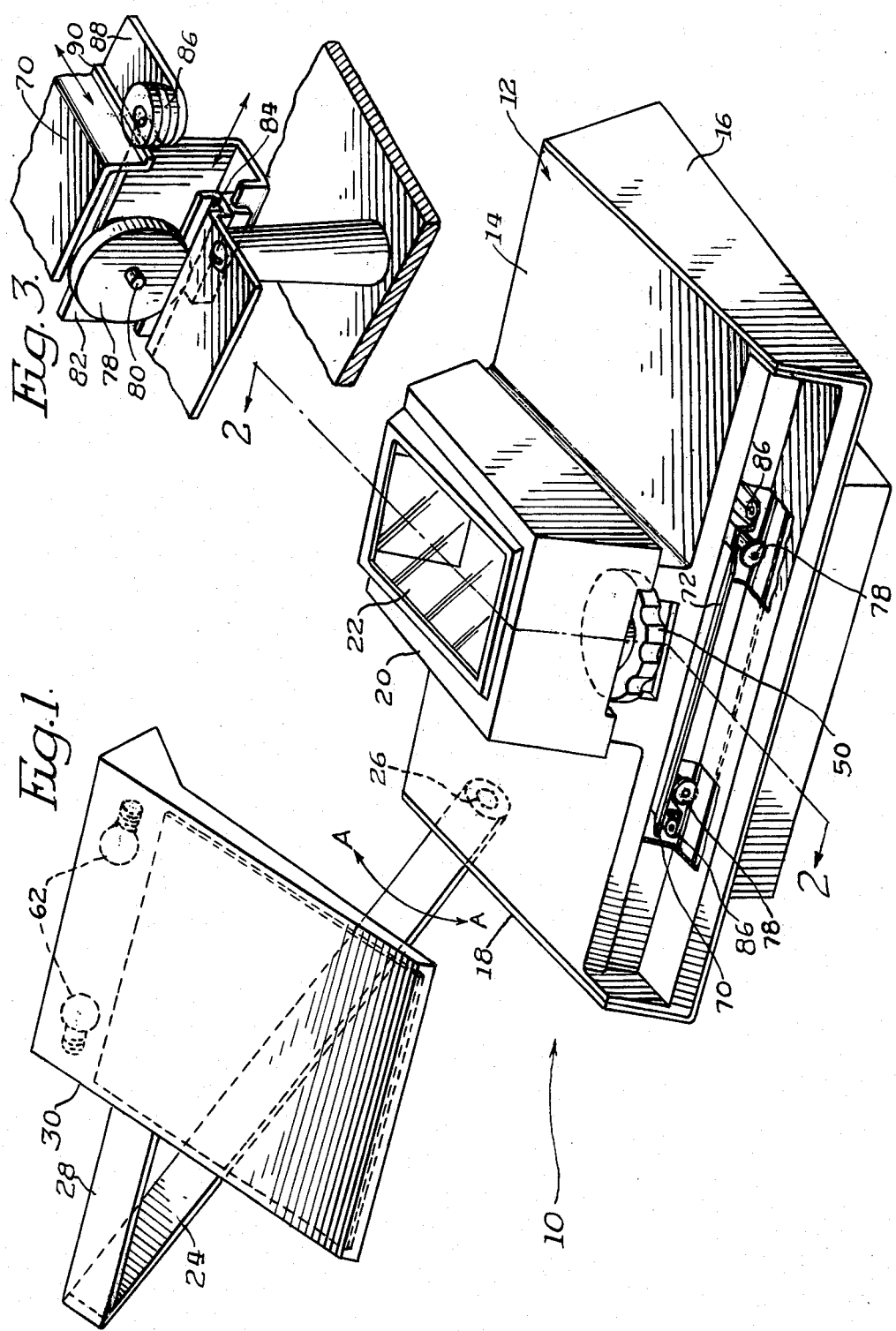
FIG. 1 is a perspective view of the inventive microfilm reader with portions removed.

Turning first to FIG. 1, a desk top microfilm reader 10, hereinafter referred to as reader 10, is illustrated. There is a housing 12 which encloses a projection system and a microfilm carriage as will be fully described below. The housing 12 has a top surface 14 and sides 16, 18. Located centrally on the housing 12 is a dome 20 which houses various parts of the projection system. In the top surface of the dome 20 is a clear glass 22 which allows the image to leave the housing 12 for projection and viewing.

An arm 24 is pivotally connected at 26 to the side 18 of the reader housing. The pivot connection 26 permits the supporting arm 24 to be pivoted in the direction illustrated by arrow "A—A". The supporting arm 24 can be pivoted from a substantially vertical orientation to an acute angular position as illustrated in FIG. 1. The vertical or first position could be in a normal, out of the way storage position whereas the second position would be for viewing microfilm images projected from the reader. The pivot connection 26 can further be designed to allow infinite position settings between the two positions.

At the top of the supporting arm 24 is a right angle brace 28 which supports a hood 30 disposed above and in front of the dome 20. By pivoting the arm 24, the hood 30 can be moved out of the line of sight of two persons sitting across from each other.

Figure 2:
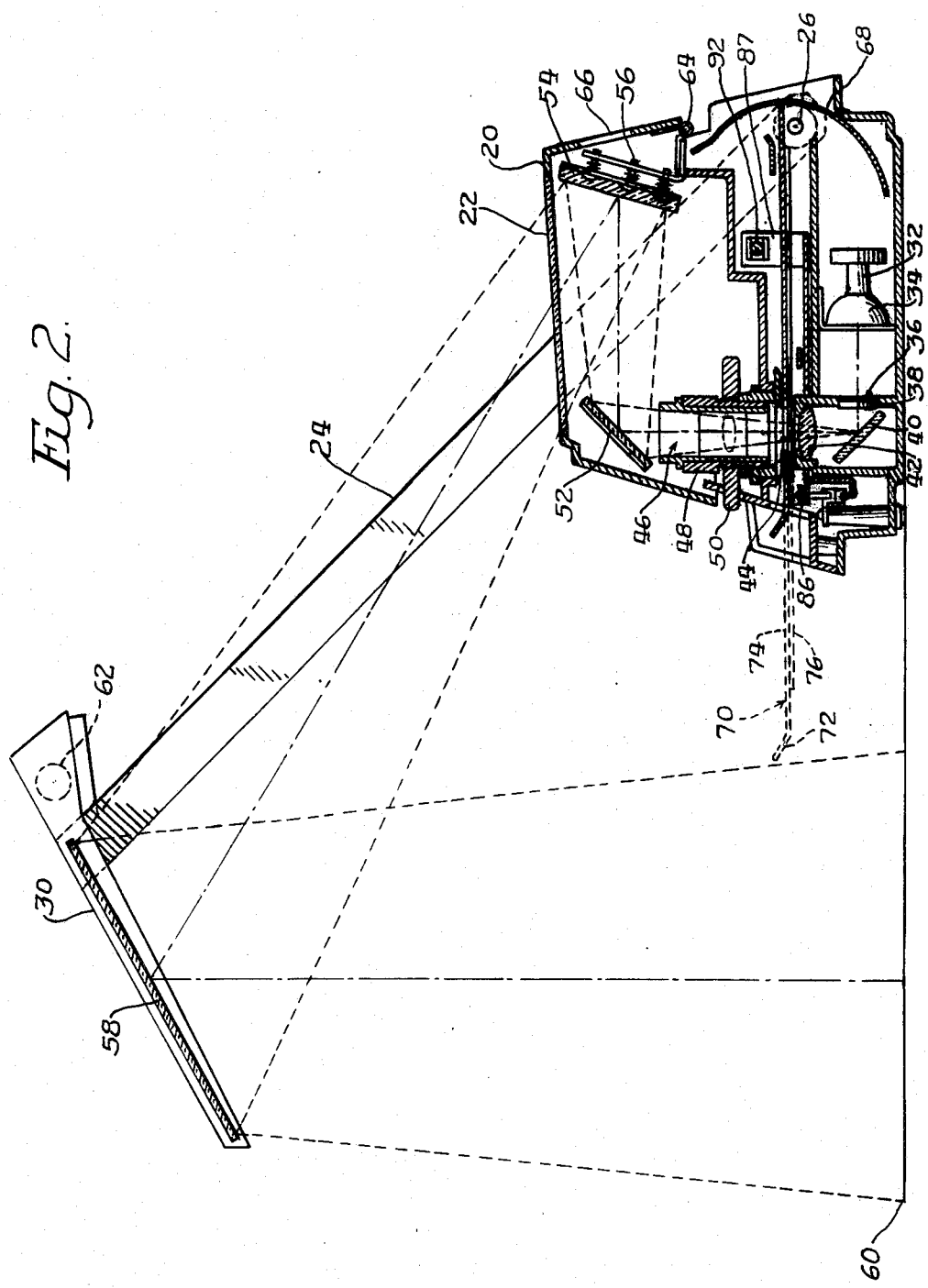
FIG. 2 is a cross-sectional view taken along line 2—2 of FIG. 1.

The projection system of the reader is best illustrated in FIG. 2. Power is supplied to a lamp 32 having a dichroic reflector 34 which projects the visible light and allows the infrared or heat producing rays to pass through the reflector and away from the microfilm. A heat mask 36, which is a piece of metal with a hole in it, is placed in front of the lamp 32. Covering the heat mask 36 is a heat absorbing filter 38 which further absorbs infrared radiation. The light beam is reflected by a mirror 40 which preferably is a dichroic mirror or "cold" mirror which allows infrared radiation to pass through the mirror and reflects only the visible light rays.

The visible light from lamp 32 is reflected through a condensor lens 42 which concentrates the light beam as it passes through a microfilm 44. A projection lens assembly 46 has a lens barrel 48 which can be moved up or down by means of a focus knob 50. The focus knob 50 projects through the front of the dome 20 so that the operator has an easy means to focus the projected image.

The image is projected onto a first mirror 52 mounted within the front of the dome 20. The image is then reflected onto a second mirror 54 disposed at the rear of the dome 20. The mirror 54 is mounted by means including adjustment screws 56 which permit adjustment of the direction of image projection toward the hood 30.

The image is projected by the mirror 54 upwardly through the glass 22 onto a third mirror 58 mounted on the underside of the hood 30. The image received by the mirror 58 is reflected downwardly onto a desk surface 60 or other horizontal surface on which the image can be viewed.

The hood 30 can be moved rearwardly about the pivot connection 26 to a position above the reader housing. In this position the hood 30 is substantially parallel to the surface 60 and out of the way of a person sitting at a desk and talking to a person on the opposite side of the desk. Furthermore, the hood 30 can have mounted therein optional lamps 62 which can be selectively energized to illuminate the desk surface 60 which would provide an additional source of illumination for reading or other work which can be done on the surface 60.

The dome 20 is hinged at 64 to the housing 12. This permits easy access to the projection lens assembly 46 to allow easy changing of the lenses. It also gives the operator access to the first and second mirrors 52, 54 for cleaning. There are several ventilation holes 66 at the back of the dome 20 to allow heat from the lamp 32 to escape. Cooling convection air currents are aided in their flow towards the ventilation holes 66 by means of an air and heat deflector 68 located in the base of the housing 12. By using cooling convection air currents, the need for a cooling fan is eliminated.

The microfilm reader 10 has a horizontal fiche receiving mechanism which will now be described. A fiche carriage 70 has a turned up front edge 72 which is grasped by the user to pull or push the fiche carriage 70 in a front to back or side to side direction. The fiche carriage 70 has a pair of glass flats 74, 76 which hold the microfilm between them. This retains the microfilm in a horizontal flat image plane such that uniform focus can be obtained across the desired image. As shown in FIG. 2, the carriage 70 is movable between a microfilm image unload position (dotted lines) and a microfilm image projecting position (solid lines). The upper glass flat 74 is raised in the load/unload position so that microfilm can be inserted for subsequent viewing.

The cut out portion of FIG. 1, and the enlarged view of that cut out portion in FIG. 3 illustrates the mechanism used to permit the horizontal movement of the fiche carriage 70. Side to side movement is permitted by means of a pair of rollers 78, which are journaled on respective shafts 80 mounted on a support bracket 82 which is affixed to a carriage support 88. The rollers 78 roll in a track 84 which is part of or affixed to the housing 12. The rear of the carriage support 88 includes a bracket 87 which is slidably received on a support rod 92 fixed within the reader housing above the carriage. Thus, the entire carriage 70 is permitted to move in a linear direction from side to side thereby positioning the proper column on the microfilm in the light beam.

The carriage 70 is supported for fore-and-aft movement between the load/unload and image projecting positions by means to be now described. Four rollers 86 are journaled on the carriage support 88, the front two of which being shown in FIG. 1. The other two rollers 86 (not shown) are disposed proximate to the rear of the support 88. The carriage 70 includes an elongated lip 90 disposed along each fore-and-aft extending edge thereof. Each lip 90 is received in the grooves of a respective pair of the rollers 86 thus rotatively supporting the carriage for fore-and-aft movement.

It will thus be seen that the carriage 70 can be selectively moved fore-and-aft and side-to-side to position selected images on the film beneath the lens assembly 46. Movement of the carriage all the way forwardly to the dotted line position of FIG. 2 permits removal and insertion of film.

It can further be seen that the fiche carriage 70 maintains the fiche in a horizontal plane which is substantially parallel to the desk surface 60. Thus, both the plane of the projected image and the plane of the fiche are both horizontal planes and substantially parallel to each other.

Figure 4:
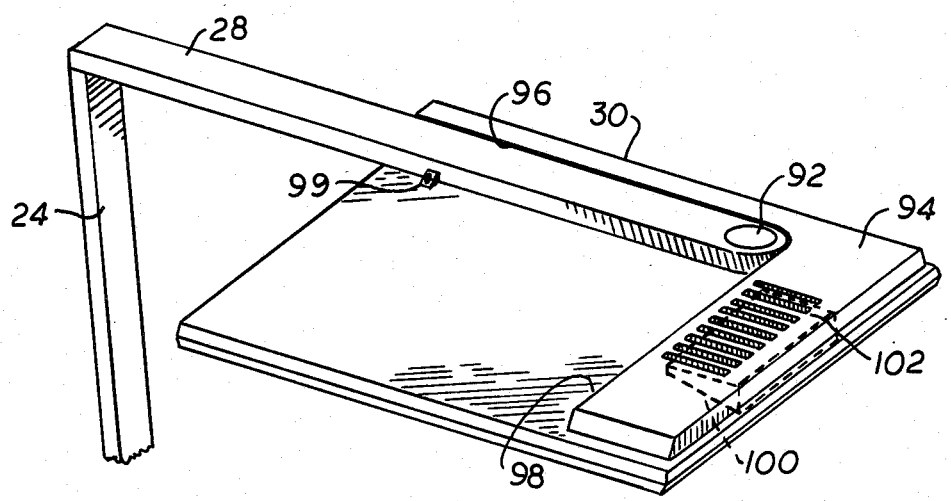
FIG. 4 is an alternative embodiment of a pivotal hood arrangement, with portions removed.
Figure 5:
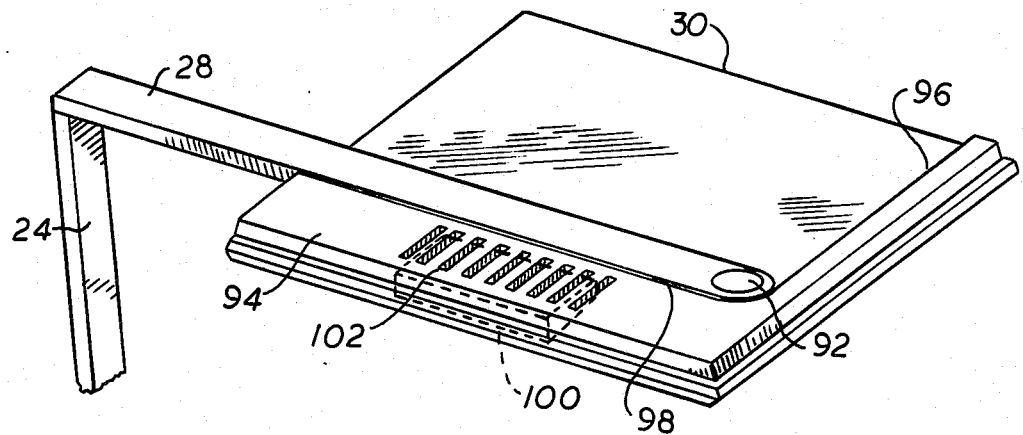
FIG. 5 is the alternative embodiment of the hood of FIG. 4 in a second pivoted position.

An alternate hood arrangement is illustrated in FIGS. 4 and 5 wherein like reference numerals are utilized where possible. The hood 30 has the third mirror 58 (not shown) mounted to its underside. The hood 30 is connected to the right angle brace 28 by means of a pivot 92. There is a generally L-shaped raised portion 94 on the top surface of the hood 30. The raised portion 94 forms two upstanding walls 96 and 98 between the top surface of raised portion 94 and the top surface of the hood 30.

The hood 30 can be pivoted to either of the two positions shown in FIGS. 4 or 5. The brace 28 strikes the wall 96 or 98, depending on the direction in which the hood 30 is pivoted. Latches 99 mounted on both sides of the brace 28 interface with complementary receiving holes in the walls 96 and 98 to lock the hood 30 in the desired position.

On the underside of the hood is a lamp housing 100 which contains the lamps 62 (not shown). The lamp housing 100 is designed to have baffles which shield the direct rays of the lamp from the user's eyes. The lamps can be used to illuminate the desk surface 60 as previously described. There are ventilation holes 102 in the top of the hood over the lamp housing 100 to provide a cooling air flow.

When the supporting arm 24 is pivoted downward into the position shown in FIG. 2, the alternate hood arrangement shown in FIGS. 4 and 5 can provide a means for pivoting only the hood 30 out of the line of sight between two people. The arm 24 does not necessarily have to be pivoted upward to move the hood 30 out of the line of sight. Thus, the reader 10 could be designed with the supporting arm 24 permanently mounted in the angled configuration shown in FIG. 2.

Thus, it is apparent, that there has been provided, in accordance with the invention, a desk top microfilm reader that fully satisfies the objects, aims and advantages set forth above. While the invention has been described in conjunction with a specific embodiment, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A desk top microform reader for use on a horizontal, planar surface comprising:
   a housing structure, enclosing projection means and microform receiving means,
   an L-shaped supporting arm having two ends, a vertically rising end mounted to one side of the housing structure, and a horizontally extending end attached to the vertically rising end and extending in the direction of the housing structure,
   a hood connected to and supported by the horizontally extending end, the hood connected to the horizontally extending end by means of a pivot connection, the hood being selectively pivoted about an axis parallel to the vertically rising end to either of two positions, with one of the positions being an image projection position,
   at least two abutment walls on the hood that contact the horizontally extending end at the two positions for accurately positioning the hood when it is pivoted from one position to the other, reflecting means mounted on the hood in spaced relationship with respect to the horizontal, planar surface, the microform receiving means comprising means to hold the microform in a flat, horizontal plane, the projection means being optically coupled to the reflecting means when the hood is pivoted to the image projection position for projecting onto the horizontal flat planar surface an optical image corresponding to an image on a microform when the image is placed in the projection means, and a substantially unenclosed, uninterrupted, optical image projection path extending from the projectiong means to the reflecting means and to the horizontal planar surface to project the image from a horizontally held microform onto a horizontal planar surface without the need of an enclosure to exclude ambient light.

2. The microform reader of claim 1 wherein the projection means includes a projection lamp, lens system focus means and mirror means with the microform receiving means supporting and retaining the microform in a horizontal plane which is perpendicular to a light beam passing through the microform from the projection lamp.

3. The microform reader of claim 2 wherein the microform receiving means comprises a pair of glass plates which hold the microform between them, the glass plates supported on a fiche carriage, means to move the fiche carriage in the horizontal plane relative to the light beam for image selection.

4. The microform reader of claim 3 wherein the means to move the fiche carriage comprises first rollers mounted on the carriage which are captured within tracks connected to the housing structure to permit movement of the rollers within the tracks, and second rollers with circumferential grooves therein connected to the housing structure with a lip on the carriage adapted to move within the groove, thereby permitting bi-directional movement of the carriage.

5. The microform reader of claim 4 and further comprising ventilation holes and air deflector means in the housing structure to direct heated air from the lamp towards the ventilation holes.

* * * * *